US007502701B2

(12) United States Patent
Grass

(10) Patent No.: US 7,502,701 B2
(45) Date of Patent: Mar. 10, 2009

(54) PC-ARRANGEMENT FOR VISUALISATION, DIAGNOSIS AND EXPERT SYSTEMS FOR MONITORING, CONTROLLING AND REGULATING HIGH VOLTAGE SUPPLY UNITS OF ELECTRIC FILTERS

(75) Inventor: Norbert Grass, Herzogenaurach (DE)

(73) Assignee: Siemens Aktiengesellschaft, Munich (DE)

( * ) Notice: Subject to any disclaimer, the term of this patent is extended or adjusted under 35 U.S.C. 154(b) by 427 days.

(21) Appl. No.: 10/509,251

(22) PCT Filed: Mar. 11, 2003

(86) PCT No.: PCT/DE03/00770

§ 371 (c)(1),
(2), (4) Date: Sep. 28, 2004

(87) PCT Pub. No.: WO03/083731

PCT Pub. Date: Oct. 9, 2003

(65) Prior Publication Data

US 2005/0119862 A1 Jun. 2, 2005

(30) Foreign Application Priority Data

Mar. 28, 2002 (DE) ................................ 102 14 185

(51) Int. Cl.
*G01R 19/00* (2006.01)
*G06F 19/00* (2006.01)
*G06F 11/30* (2006.01)
(52) U.S. Cl. ..................... 702/64; 713/300; 713/340
(58) Field of Classification Search .................. 702/64; 713/300, 340
See application file for complete search history.

(56) References Cited

U.S. PATENT DOCUMENTS 4,432,061 A * 2/1984 Herklotz et al. ............. 700/298
5,053,914 A * 10/1991 Wessel et al. ................ 361/235
5,471,377 A * 11/1995 Donig et al. ...................... 95/5

(Continued)

FOREIGN PATENT DOCUMENTS

DE 198 53 205 A1 11/1998

(Continued)

*Primary Examiner*—Eliseo Ramos Feliciano
*Assistant Examiner*—Janet L Suglo
(74) *Attorney, Agent, or Firm*—Harness, Dickey & Pierce

(57) ABSTRACT

A PC-arrangement is for visualisation, diagnosis and expert systems for monitoring, controlling or regulating high voltage supply units of electric filters. The PC-arrangement for visualisation, diagnosis and expert systems for monitoring, controlling and regulating high voltage supply units of electric filters includes a server-PC which is linked to high-voltage supply units of electric filters via a first network; and a client-PC forming a second network with the server-PC. In order to keep the network load on the first network connecting the server PC to the high voltage supply units as low as possible and to use Microsoft-standard mechanisms for distributed systems in order to achieve network capability for visualisation and measuring data processing systems, a software structure of the PC-device is broken down into autarchic software modules which respectively carry out at least one function. One autarchic server software module is formed in order to carry out data transfer and data exchange with the high-voltage supply units. The server software module is executed on the server PC connected to the high voltage supply units of the electric filters via the first network, and the other software modules are executed on each client-PC or the server-PC.

28 Claims, 2 Drawing Sheets

U.S. PATENT DOCUMENTS

| | | | |
|---|---|---|---|
| 5,611,059 A | 3/1997 | Benton et al. | 715/734 |
| 5,650,936 A | 7/1997 | Loucks et al. | 702/62 |
| 5,864,683 A | 1/1999 | Boebert et al. | |
| 5,920,474 A * | 7/1999 | Johnson et al. | 363/126 |
| 6,449,715 B1 * | 9/2002 | Krivoshein | 713/1 |
| 2001/0037161 A1 | 11/2001 | Hess et al. | |
| 2002/0021731 A1 * | 2/2002 | Bragin et al. | 372/57 |
| 2002/0022894 A1 | 2/2002 | Eryurek et al. | |
| 2003/0012039 A1 * | 1/2003 | Wiser et al. | 363/37 |

FOREIGN PATENT DOCUMENTS

| | | |
|---|---|---|
| DE | 100 50 188 C1 | 10/2000 |
| DE | 101 12 843 A1 | 3/2001 |
| WO | WO 99/60487 | 11/1999 |

\* cited by examiner

PC-ARRANGEMENT FOR VISUALISATION, DIAGNOSIS AND EXPERT SYSTEMS FOR MONITORING, CONTROLLING AND REGULATING HIGH VOLTAGE SUPPLY UNITS OF ELECTRIC FILTERS

This application is the national phase under 35 U.S.C. § 371 of PCT International Application No. PCT/DE03/00770 which has an International filing date of Mar. 11, 2003, which designated the United States of America and which claims priority on German Patent Application number DE 102 14 185.1 filed Mar. 28, 2002, the entire contents of which are hereby incorporated herein by reference.

FIELD OF THE INVENTION

The invention generally relates to a PC arrangement for visualization, diagnosis and expert systems for monitoring and controlling or regulating high-voltage supply units for electrostatic filters, having a server PC, which is linked by way of a first network to the high-voltage supply units for the electrostatic filter, and client PCs, which form a second network with the server PC.

BACKGROUND OF THE INVENTION

The control and optimization of high-voltage supply units is essential to the operational reliability, the efficiency and the operation of the electrostatic filter. For the purpose of controlling the visualization system remotely, special remote access software is used in the case of known PC arrangements such as these. It is also possible to achieve the desired network functionality using OPC servers, in which case, however, it is only possible to update data cyclically. Event-controlled data transmission, for example in the case of oscilloscope operation, is not possible.

SUMMARY OF THE INVENTION

An embodiment of the invention is based on an object of developing a PC arrangement for visualization, diagnosis and expert systems for monitoring and controlling or regulating high-voltage supply units for electrostatic filters. This may be done such that, in order to achieve the network capability of visualization and measured data processing systems, the use of Microsoft standard mechanisms, for example, is possible. In that case, in addition, the integration of cyclic and event-controlled data processing can be realized. Further, the network load on the first network, which connects the server PC to the high-voltage supply units, can be kept as low as possible.

An object may be achieved according to the an embodiment of the invention by a software structure for the PC arrangement being broken down into autonomous software modules. In each case, the modules may realize at least one functionality. One of them may be in the form of an autonomous server software module which realizes the data transmission or the data exchange with the high-voltage supply units. The server software module may be implemented on the server PC connected to the high-voltage supply units for the electrostatic filter via the first network. Further, it is possible for the further software modules to be implemented on each client PC or the server PC.

The first network, which connects the server PC to the high-voltage supply units, may advantageously be in the form of a Profibus network. Alternatively, this first network may also be in the form of an Ethernet network using TCP/IP.

The second network, which connects the server PC to the client PCs, may be in the form of a standard network, for example in the form of an Ethernet network using TCP/IP protocol.

In order to ensure that, when any desired client application is started, the server PC or the server software module implemented on the server PC is automatically started as soon as data from the high-voltage supply units is required at the client PCs, it is advantageous if the server software module implemented on the server PC is in the form of a COM+/DCOM server or a WinSocket server.

Expediently, one group of high-voltage supply units has an associated bus coupler. The server software module may be advantageously designed such that it can be used to categorize a large number of data from controllers of the high-voltage supply units differently, it being possible to cyclically update an image of critical measured and status data from the controllers in the server software module, whereas other data, for example parameter data, oscilloscope data, characteristic data and the like, can be transmitted at the request of one of the client PCs.

A connection between the server PC, which implements the server software module, and the controllers can be started automatically when data from the controllers is requested at one or more client PCs.

The functionality "measured data archiving" is expediently realized by an autonomous measured data software module, which is advantageously in the form of a databank in which measured and status data can be archived for a predeterminable period of time.

The functionalities "visualization, parameter setting, device control" are realized according to one advantageous embodiment of the PC arrangement according to an embodiment of the invention by an autonomous display software module, it expediently being possible, by means of the display software module, to access data stored in the measured data software module, to access measured and status data updated in the server software module and, by way of the server software module, to directly access further data available in the controllers.

The display software module can preferably be implemented on two or more client PCs and the server PC simultaneously.

The display software module can expediently be realized on different user planes, for example on an operator plane and an expert plane, with the result that different monitoring and intervention measures are possible for persons having different levels of authority.

The functionality "control of auxiliary drives" is expediently realized by an autonomous control software module, in which components of the electrostatic filter can be matched automatically to different operating conditions of the electrostatic filter by way of this control software module.

The functionality "optimization" may be realized by an autonomous optimization software module, by which the operation of the electrostatic filter can be optimized using as a basis, for example, the efficiency of the electrostatic filter and/or the energy consumption of the electrostatic filter.

Advantageously, the server software module implemented in the server PC can be accessed by way of the measured data software module, the display software module, the optimization software module and the control software module.

The data transmission or the data exchange via the server software module is advantageously both cyclic and event-controlled.

BRIEF DESCRIPTION OF THE DRAWINGS

Further advantages, features and details of the invention will become evident from the description of illustrated exemplary embodiments given hereinbelow and the accompanying drawings, which are given by way of illustration only and thus are not limitative of the present invention, wherein.

DETAILED DESCRIPTION OF THE PREFERRED EMBODIMENTS

Figure 1:
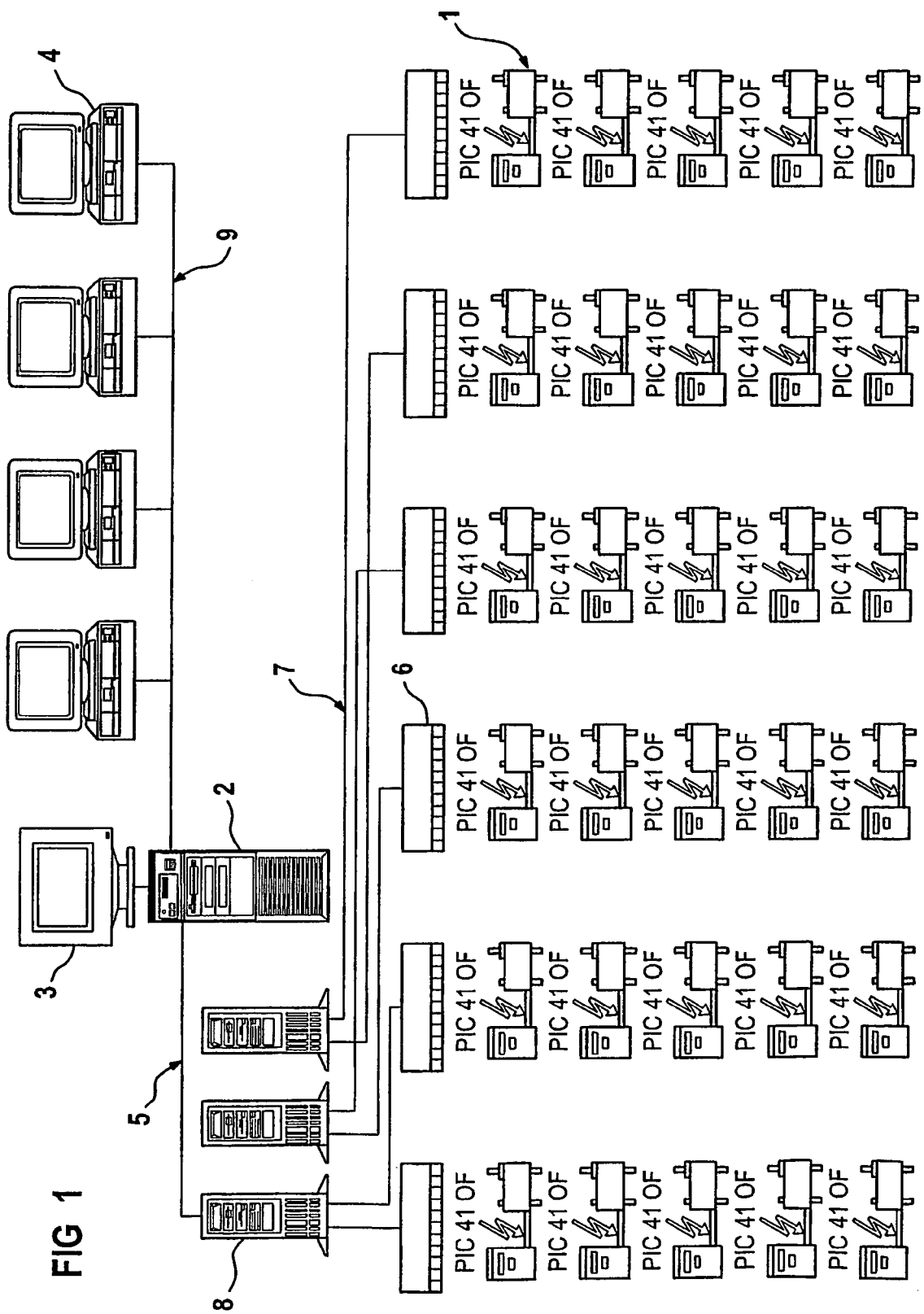
FIG. 1 shows an embodiment of a PC arrangement according to the invention for visualization, diagnosis and expert systems for monitoring and controlling or regulating high-voltage supply units for electrostatic filters.

An embodiment shown in FIG. 1 of a PC arrangement according to the invention for visualization, diagnosis and expert systems for monitoring and controlling or regulating high-voltage supply units 1, provided with controllers, for electrostatic filters has a server PC 2 having a monitor 3 and (in the exemplary embodiment illustrated) four client PCs 4.

The server PC 2 is connected to the high-voltage supply units 1 via a first network 5 in the form of a Profibus network. For this purpose, in each case one group of (in the exemplary embodiment illustrated) five high-voltage supply units 1 having controllers has in each case one associated bus coupler 6. The (in the exemplary embodiment illustrated) six bus couplers 6 are connected via an optical Profibus 7 to optical connection modules 8 which are connected for their part to the server PC 2.

The server PC 2 forms, with the (in the exemplary embodiment illustrated) four client PCs 4, a second network 9 which, in the exemplary embodiment illustrated, may be in the form of an Ethernet network using TCP/IP protocol. Furthermore, conventional standard networks may be used as the second network 9.

By way of the abovementioned PC arrangement, it is possible to carry out the device control and the measured data visualization of the high-voltage supply units 1 on the server PC 2 and/or on any desired client PC 4 in the second network 9. The network load of the Profibus network 5, which connects the server PC 2 to the controllers of the high-voltage supply units 1, is in this case kept as low as possible.

The high-voltage supply units 1 shown in FIG. 1 serve the purpose of producing the high voltage for the electrostatic filter. The control and optimization of these high-voltage supply units 1 is essential to the efficiency of the electrostatic filter.

Figure 2:
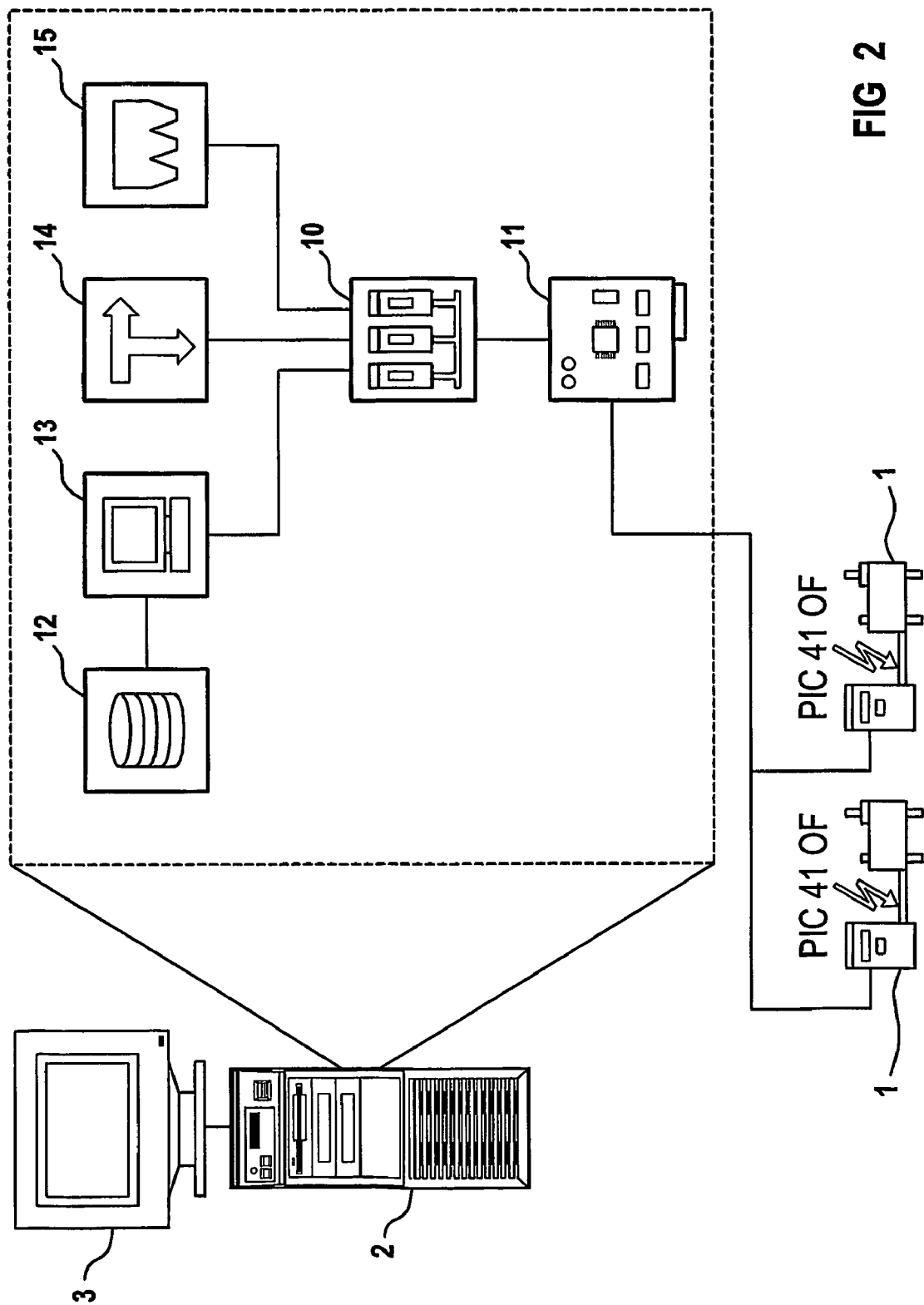
FIG. 2 shows a block diagram of software modules used in the PC arrangement shown in FIG. 1.

The functionalities which can be realized by way of the PC arrangement described above, including the server PC 2 and the client PCs 4, for example the measured data archiving, the visualization, the optimization, the regulation and the data transmission, are broken down into autonomous software modules, as is represented in particular in FIG. 2, which illustrates the structure of these software modules.

An autonomous server software module 10, which realizes the data transmission or the data exchange with the high-voltage supply units 1 or their controllers, is implemented on the server PC 2 connected to the controllers of the high-voltage supply units 1 of the electrostatic filter via the Profibus network 5. This server software module 10 may advantageously be in the form of a DCOM server or a WinSocket server. The server software module 10 runs exclusively on the server PC 2, as is illustrated in FIG. 2 by means of communication with a Profibus card 11.

The further software modules provided in the embodiment illustrated in the FIGURES, namely a measured data software module 12, a display software module 13, a control software module 14 and an optimization software module 15, may be implemented on any desired PC, i.e. on the server PC and/or each client PC 4 of the PC arrangement.

The server PC 2 or the server software module 10 implemented on it exchanges data cyclically and in an event-controlled manner with the controllers 6 of the high-voltage supply units 1. This data can be categorized differently by means of the server software module 10, an image of measured and status data, critical for the operation of the high-voltage supply units 1, from the controllers 6 associated with the high-voltage supply units 1 being updated cyclically in the server software module 10. Further data, for example parameter data, oscilloscope data, characteristic data and the like can in each case be transmitted to a client PC 4 or to the server PC 2 at their request.

When the data in the last-mentioned category is requested at the server PC 2 or at a client PC 4, the connection between the server PC 2, which implements the server software module 10, and the controllers can be started automatically.

The functionally "measured data archiving" is realized by the autonomous measured data software module 12, the measured data software module 12 being in the form of a databank or data system in which measured and status data can be archived for a predeterminable period of time.

The functionalities "visualization, parameter setting, device control" are realized by the display software module 13. Correspondingly, the display software module 13 makes it possible to visualize all of the data, to set or adjust parameters and to control the high-voltage supply units 1. The data which can be visualized by use of the display software module 13 may be both retrieved from the measured databank, realized by way of the measured data software module 12, and transmitted via the server PC 2 or the server software module 10 running there directly from the high-voltage supply units 1 or their controllers.

The display software module 13 may be implemented at the same time on two or more PCs 2, 4 of the PC arrangement. The display software module 12 can be realized on different user planes, for example on operator and expert planes.

The functionality "control of auxiliary drives" is realized by the control software module 14 and makes it possible, for example, for the plate knocking of the electrostatic filter to be matched automatically to different operating conditions.

The optimization software module 15 realizing the functionality "optimization" results in the operation of the electrostatic filter taking place in an optimum manner taking into account the efficiency of said electrostatic filter and/or its energy consumption.

The realization of the server software module 10 using COM+/DCOM has the result that, at the beginning of any desired application on a client PC 4, for example visualization, optimization or data archiving, the server is started automatically as soon as the data is required by the controllers.

In the case of the PC arrangement according to an embodiment of the invention, which is described above with reference to an exemplary embodiment, comprising a server PC 2 and client PCs 4, it is possible, for the purpose of achieving the network capability of visualization and measured data processing systems, to use Microsoft standard mechanisms for distributed systems. Furthermore, the integration of cyclic and event-controlled data processing is achieved.

Visible on a display, which is associated with the display software module 13 and is formed by said display software module 13, are the parameter setting, the measured values, an online oscilloscope, characteristics, visualization of the long-term data archive, error statistics and Profibus monitoring.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A PC arrangement for visualization, diagnosis and expert systems for at least one of regulating, monitoring and controlling units comprising:

a server PC, linked via a first network to the units; and client PCs, forming a second network with the server PC and connected to the first network for at least one of data transmission and data exchange with the units via the server PC, wherein software structure for the PC arrangement is broken down into autonomous software modules, which each realize at least one functionality, wherein one of the software modules is an autonomous server software module, which realizes the at least one of data transmission and data exchange with the units, and is implemented on the server PC connected to the units via the first network, wherein at least another of the software modules are implementable on at least one of a client PC and the server PC, wherein the server software module is used to categorize a large number of data from controllers of the units differently, wherein imaging of measured and status data from the controllers in the server software module is cyclically updatable, wherein other data is transmittable at a request of one of the client PCs, and wherein the units are high-voltage supply units for electrostatic filters.

2. The PC arrangement as claimed in claim 1, wherein the first network, which connects the server PC to the high-voltage supply units, is a Profibus network.

3. The PC arrangement as claimed in claim 2, wherein the second network, which connects the server PC to the client PCs, is an Ethernet network using TCP/IP protocol.

4. The PC arrangement as claimed in claim 1, wherein the first network, which connects the server PC to the high-voltage supply units, is an Ethernet network using TCP/IP.

5. The PC arrangement as claimed in claim 4, wherein the second network, which connects the server PC to the client PCs, is an Ethernet network using TCP/IP protocol.

6. The PC arrangement as claimed in claim 1, wherein the second network, which connects the server PC to the client PCs, is a standard network.

7. The PC arrangement as claimed in claim 1, wherein the server software module implemented on the server PC is at least one of a DCOM server and a WinSocket server.

8. The PC arrangement as claimed in claim 1, wherein one group of high-voltage supply units has an associated bus coupler.

9. The PC arrangement as claimed in claim 8, wherein a connection between the server PC, which implements the server software module and the controllers, is automatically startable when data from the controllers is requested at one or more client PCs.

10. The PC arrangement as claimed in claim 1, wherein an autonomous measured data software module archives the measured data.

11. The PC arrangement as claimed in claim 10, wherein the measured data software module is at least one of a databank and data system in which measured and status data are archived for a period of time.

12. The PC arrangement as claimed in claim 1, wherein an autonomous display software module displays data relating to the high-voltage supply units, sets at least one parameter of the high-voltage supply units and controls the high-voltage supply units.

13. The PC arrangement as claimed in claim 12, wherein, by use of the display software module, data stored in the measured data software module is accessible, measured and status data updated in the server software module is accessible and, by use of the server software module, further data available in the controllers is directly accessible.

14. The PC arrangement as claimed in claim 13, wherein the display software module is implementable on at least two client PCs and the server PC simultaneously.

15. The PC arrangement as claimed in claim 13, wherein the display software module is configured to provide different monitoring and intervention measures to persons having different levels of authority.

16. The PC arrangement as claimed in claim 12, wherein the display software module is implementable on at least two client PCs and the server PC simultaneously.

17. The PC arrangement as claimed in claim 16, wherein the display software module is configured to allow different monitoring and intervention measures to persons having different levels of authority.

18. The PC arrangement as claimed in claim 12, wherein the display software module is configured to provide different monitoring and intervention measures to persons having different levels of authority.

19. The PC arrangement as claimed in claim 1, wherein an autonomous control software module controls auxiliary drives of the high-voltage supply units.

20. The PC arrangement as claimed in claim 19, wherein the control software module is adapted to match components of the electrostatic filter, automatically, to different operating conditions of the electrostatic filter.

21. The PC arrangement as claimed in claim 1, wherein an autonomous optimization software module optimizes operation of the high-voltage supply units.

22. The PC arrangement as claimed in claim 21, wherein, use of the optimization software module, is adapted to optimize the operation of the electrostatic filter based on at least one of efficiency of the electrostatic filter and energy consumption of the electrostatic filter.

23. The PC arrangement as claimed in claim 1, wherein the server software module implemented in the server PC is accessible by use of a measured data software module, a display software module, an optimization software module and a control software module.

24. The PC arrangement as claimed in claim 1, wherein at least one of the data transmission and the data exchange, via the server software module, is both cyclic and event-controllable.

25. The PC arrangement as claimed in claim 1, wherein the second network, which connects the server PC to the client PCs, is an Ethernet network using TCP/IP protocol.

26. The PC arrangement as claimed in claim 1, wherein a connection between the server PC which implements the server software module and the controllers is automatically startable when data from the controllers is requested at one or more client PCs.

27. The PC arrangement as claimed in claim 1, wherein the other data includes oscilloscope data associated with at least one of the high-voltage supply units for electrostatic filters.

28. The PC arrangement as claimed in claim 1, wherein the other data further includes parameter data and characteristic data associated with the at least one of the high-voltage supply units for electrostatic filters.

* * * * *